United States Patent [19]  [11]  4,162,274
Rosenkranz  [45]  Jul. 24, 1979

[54] CROSSLINKABLE URETHANE RESINS CONTAINING VINYL AND CARBOXYL GROUPS

[75] Inventor: Hans J. Rosenkranz, Krefeld, Fed. Rep. of Germany

[73] Assignee: Bayer Aktiengesellschaft, Leverkusen, Fed. Rep. of Germany

[21] Appl. No.: 749,454

[22] Filed: Dec. 10, 1976

[30] Foreign Application Priority Data

Dec. 19, 1975 [DE] Fed. Rep. of Germany ....... 2557408

[51] Int. Cl.$^2$ ............................................. C08L 63/10
[52] U.S. Cl. .................................. 528/75; 204/159.19; 96/115 K; 96/35.1; 528/69; 525/528; 525/450; 525/451; 525/454
[58] Field of Search ....... 260/837 R, 836 (U.S. only); 96/115 R (U.S. only); 204/159.19

[56] References Cited

U.S. PATENT DOCUMENTS

| | | | |
|---|---|---|---|
| 3,373,221 | 3/1968 | May .................................. | 260/836 |
| 3,478,126 | 11/1969 | Turpin .............................. | 260/837 R |
| 3,634,542 | 1/1972 | Dowd et al. ...................... | 260/837 R |
| 3,980,483 | 9/1976 | Nishikubo et al. ................ | 96/115 R |

*Primary Examiner*—Hosea E. Taylor
*Assistant Examiner*—Amelia B. Yarbrough
*Attorney, Agent, or Firm*—Connolly and Hutz

[57] ABSTRACT

A crosslinkable, especially photopolymerizable urethane resin soluble in organic solvent, suitable as starting materials for photoresist lacquers and for the production of photopolymer printing plates comprising a reaction product of a polyepoxide having more than one 1,2-epoxide group per molecule with acrylic and/or methacrylic acid so that from 60 to 100 mole % of the 1,2-epoxide groups are converted into β-hydroxy acrylic or methacrylic ester groups; 30 to 90 mole % of said β-hydroxy ester groups having been reacted with an isocyanate and subsequently 10 to 70 mole % of said β-hydroxy ester groups having been converted into acid semiester groups with a cyclic dicarboxylic acid anhydride.

6 Claims, No Drawings

CROSSLINKABLE URETHANE RESINS CONTAINING VINYL AND CARBOXYL GROUPS

This invention relates to crosslinkable urethane resins containing vinyl and carboxyl groups which may be used as starting materials for photoresist lacquers, especially for the production of dry resist films, and for the production of photopolymer printing plates.

Numerous vinylically polymerising resin systems which harden under the action of UV-light to form an insoluble, crosslinked material are already known. Materials such as these are used as UV-light-hardening lacquers and coating compositions. Under suitable conditions, it is also possible to produce resist lacquers and photopolymer printing plates on this basis. A certain insight into this field of application is given in J. Kosar's book "Light Sensitive Systems," J. Wiley, New York - London - Sidney 1965.

Resins which crosslink by vinyl polymerisatiion have a number of advantages over other systems crosslinkable by UV-light: in most cases, even minimal exposure to light is sufficient to initiate a chain reaction by means of a photoinitiator, this chain reaction resulting in the formation of absolutely solid, insoluble layers. Vinylically polymerising and crosslinking materials have proved to be particularly effective in applications where the hardened photopolymer system has to satisfy stringent mechanical or chemical requirements, for example for photopolymer printing plates or for resist materials which are intended for use in particularly aggressive etching solutions.

One disadvantage of systems such as these, which can only be eliminated to a certain extend, is their poor adhesion, in particular to metallic substrates. Significantly, there has hitherto never been a vinylically polymerising lacquer system which could be used for coating metals. The already mentioned dry resist lacquers, which are laminated in the form of a film on the substrate, generally a copper plate, require intensive cleaning and fine roughening of the substrate before adequate adhesion can be obtained. Apart from inadequate mechanical anchorage, however, the effect of poor adhesion in this particular application is above all an unacceptable etching and plating of the copper plate even at parts which should be protected by the resist film.

Accordingly, one objective in the development of a starting material for a dry resist film must be to improve adhesion to the substrates typically used in this particular application.

Another important criterion for the quality of a resist material, but even more so for the suitability of a starting material for the production of photopolymer printing plates, is the mechanical strength of the hardened, crosslinked layer.

Numerous photopolymer printing plates which entirely satisfy one or the other requirement have been developed and are commercially available. A few hundred thousand prints of a printing plate can be obtained without difficulty in the case of some commercial products. However, a less satisfactory aspect of all these printing plates is their thermal stability. Thus, there has never yet been a material capable of withstanding the matrixing process encountered in the printing of newspapers. Under the effect of heat, conventional photopolymer printing plates lose their mechanical strength so that it is only possible to produce a matrix of poor quality, if at all.

Accordingly, an improved mechanical strength at elevated temperature is a requirement which must be satisfied in the development of a new photopolymer for this field of application.

Accordingly, an object of the present invention is to develop a process for the production of a new resin system, crosslinkable in particular by photopolymerisation, which is distinguished by considerably improved adhesion to the substrates used and which, even in hardened form, shows high strength even at elevated temperature.

According to the invention, this object is achieved by reacting polyepoxides containing more than one 1,2-epoxide group per molecule with (meth)acrylic acid, urethanising the $\beta$-hydroxy ester groups formed to a level of 30 to 90 mole % and converting the remaining $\beta$-hydroxy ester groups into the corresponding semiesters with cyclic dicarboxylic acid anhydrides.

Accordingly, the invention relates to a process for the production of a crosslinkable urethane resin, which contains vinyl and carboxy groups and which is soluble in organic solvents, from polyepoxides containing more than one 1,2-epoxide group per molecule, $\alpha,\beta$-monoolefinically unsaturated carboxylic acids, isocyanates and cyclic dicarboxylic acid anhydrides, distinguished by the fact that the polyepoxide is initially reacted with acrylic and/or methacrylic acid, so that from 60 to 100 mole % of the 1,2-epoxide groups present are converted into $\beta$-hydroxy acrylic or methacrylic acid ester groups, after which the corresponding hydroxy groups are reacted with an isocyanate so that from 30 to 90 mole % of the hydroxy groups in the $\beta$-hydroxy acrylic or $\beta$-hydroxy methacrylic acid esters are converted into the corresponding urethanes, and finally the hydroxy groups still present are reacted with a cyclic dicarboxylic acid anhydride, at least 10% of the originally formed hydroxy groups in the $\beta$-hydroxy ester being converted into the acid semiester.

From 90 to 100 mole % of the 1,2-epoxide groups are preferably reacted with (meth)acrylic acid to form $\beta$-hydroxy (meth)acrylic acid ester groups. From 40 to 60 mole % of the hydroxy groups in the $\beta$-hydroxy esters are preferably urethanised. In addition, it is preferred to convert from 10 mole % to 70 mole % and more especially from 60 mole % to 40 mole % of the originally formed hydroxy groups in the $\beta$-hydroxy ester groups into the acid semiester.

The invention also relates to the products obtained by the claimed process which are surprisingly distinguished by a combination of good adhesion and extreme hardness and which are eminently suitable for the production of photoresist lacquers and photopolymer printing plates.

In the context of the invention, polyepoxides are compounds which contain more than one 1,2-epoxide group per molecule, preferably from 1.6 to 6 and more especially from 1.6 to 3 epoxide groups per molecule. In addition, an epoxide equivalent is the quantity in grams of a compound containing 1,2-epoxide groups which contains one mole of the 1,2-epoxide group.

The polyepoxide compounds used may be polyglycidyl ethers of polyhydric phenols, for example of pyrocatechol, resorcinol or hydroquinone, of 4,4'-dihydroxy diphenyl methane, of 4,4'-dihydroxy-3,3'-dimethyl diphenyl methane, of 4,4'-dihydroxy diphenyl dimethyl methane (bisphenol A), of 4,4'-dihydroxy diphenyl methyl methane, of 4,4'-dihydroxy diphenyl cyclohexane, of 4,4'-dihydroxy-3,3'-dimethyl diphenyl propane, of 4,4'-dihydroxy diphenyl, of 4,4'-dihydroxy diphenyl sulphone, of tris-(4-hydroxyphenyl)-methane, and of the chlorination and bromination products of the above-mentioned diphenols, especially of bisphenol A; of novolaks (i.e. of products formed by reacting monohydric or polyhydric phenols with aldehydes, especially formaldehyde, in the presence of acid catalysts), of diphenols obtained by the esterification of 2 moles of the sodium salt of an aromatic hydroxy carboxylic acid with 1 mole of a dihalogen alkane or dihalogen dialkyl ether (cf. British Patent Specification No. 1,017,612), of polyphenols obtained by the condensation of phenols and long-chain halogen paraffins containing at least 2 halogen atoms (cf. British Patent Specification No. 1,024,288).

The polyepoxide compounds used may also be glycidyl ethers of polyhydric alcohols, for example of 1,4-butane diol, 1,4-butene diol, glycerol, trimethylol propane, pentaerythritol and polyethylene glycols. Triglycidyl isocyanurate and N,N'-diepoxy propyl oxamide are also of interest.

It is also possible to use glycidyl esters of polybasic aromatic, aliphatic and cycloaliphatic carboxylic acids, for example phthalic acid diglycidyl ester, isophthalic acid diglycidyl ester, terephthalic acid diglycidyl ester, tetrahydrophthalic acid diglycidyl ester, adipic acid diglycidyl ester, or hexahydrophthalic acid diglycidyl ester, which may optionally be substituted by methyl groups, and glycidyl esters of products formed by reacting 1 mole of an aromatic or cycloaliphatic dicarboxylic acid anhydride and ½ mole of a diol or 1/n mole of a polyol having n hydroxyl groups, for example glycidyl carboxylic acid esters corresponding to the general formula:

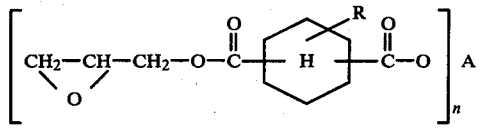

in which A represents an at least difunctional radical of an aliphatic hydrocarbon optionally interrupted by oxygen and/or cycloaliphatic rings, or the bifunctional radical of a cycloaliphatic hydrocarbon, R represents hydrogen or alkyl radicals containing from 1 to 3 carbon atoms, and n is a number from 2 to 6,
or mixtures of glycidyl carboxylic acid esters corresponding to the above general formula (cf. British Patent Specification No. 1,220,702). The following polyepoxide compounds or mixtures thereof are preferably used for the process according to the invention: polyglycidyl ethers of polyhydric phenols, especially of bisphenol A; phthalic acid diglycidyl ester, isophthalic acid diglycidyl ester, terephthalic acid diglycidyl ester, polyglycidyl esters of cycloaliphatic dicarboxylic acids, especially hexahydrophthalic acid diglycidyl ester, and polyepoxides of the product formed by reacting n moles of hexahydrophthalic acid anhydride and/or phthalic acid anhydride with 1 mole of a polyol having n hydroxyl groups (n an integer from 2 to 6), more especially by reacting 3 moles of hexahydrophthalic acid anhydride and/or phthalic acid anhydride with 1 mole of 1,1,1-trimethylol propane.

The above-mentioned epoxy resins may also be preextended by reaction with aliphatic or aromatic dicarboxylic acids, with dimercaptans or H$_2$S, or with amines or ammonia in cases where a higher molecular weight of this starting component is required.

The addition reaction of the acrylic and/or methacrylic acid with the polyepoxides is carried out by known methods, for example by the processes described in U.S. Pat. Nos. 3,301,743 and 2,824,851, in the absence or presence of solvents such as, for example, butyl acetate, ethyl acetate, acetone, ethyl methyl ketone, diethyl ketone, cyclohexane, cyclohexanone, cyclopentane, cyclopentanone, n-heptane, n-hexane, n-octane, isooctane, methylene chloride, chloroform, 1,1-dichloroethane, 1,2-dichloroethane, 1,1,2-trichloroethane or carbon tetrachloride. If desired, the addition of the (meth)acrylic acid may be carried out in the presence of about 0.01 to 3% by weight, based on the starting epoxide, of catalysts, such as tertiary amines, alkali metal hydroxides, alkali metal salts of organic carboxylic acids, bis-(hydroxyalkyl)-sulphides, sulphonium compounds, phosphonium compounds, phosphines, arsines or stibines. Reaction temperatues in the range of from 40° C. to 90° C. have proved to be suitable, although it is possible in special cases to use reaction temperatures above or below this range. In order to protect the resulting reaction products against undesirable premature polymerisation, it is advisable to add from 0.001 to 0.1% by weight, based on the total mixture, of polymerisation inhibitors during their actual production.

Suitable polymerisation inhibitors are, for example, phenols and phenol derivatives, preferably sterically hindered phenols which contain alkyl substituents having 1 to 6 carbon atoms in both o-positions relative to the phenolic hydroxy group, amines, preferably secondary arylamines and their derivatives, quinones, copper (I) salts of organic acids or addition compounds of copper (I) halides with phosphites.

The following polymerisation inhibitors are mentioned by name: 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxybenzyl phosphonic acid diethyl ester, N,N'-bis-($\beta$-naphthyl)-p-phenylene diamine, N,N'-bis-(1-methylheptyl)-p-phenylene diamine, phenyl-$\beta$-naphthylamine, 4,4'-bis-($\alpha$,$\alpha$-dimethylbenzyl)-diphenylamine, 1,3,5-tris-(3,5-di-tert.-butyl-4-hydroxy-hydrocinnamoyl)-hexahydro-s-triazine, hydroquinone, p-benzoquinone, 2,5-di-tert.-butyl quinone, toluhydroquinone, p-tert.-butyl pyrocatechol, 3-methyl pyrocatechol, 4-ethyl pyrocatechol, chloranil, naphthoquinone, copper naphthenate, copper octoate, Cu-(I)Cl/triphenyl phosphite, Cu(I)Cl/trimethyl phosphite, Cu(I)Cl/trischloroethyl phosphite, Cu(I)Cl/tripropyl phosphite, and p-nitrosodimethyl aniline.

Other suitable stabilisers are described in "Methoden der organischen Chemie" (Houben-Weyl), 4th Edition, Vol. XIV/1, pages 433–452, 756, Georg Thime Verlag, Stuttgart, 1961. p-Benzoquinone and/or hydroquinone monomethyl ether are examples of very suitable stabilisers preferably being used in a concentration of from 0.001 to 0.05% by weight, based on the mixture as a whole.

The resulting reaction products formed from the epoxide resin and the acrylic and/or methacrylic acid are $\beta$-hydroxyalkyl esters which immediately afterwards may be reacted with isocyanates. In this way, it is possible to obtain resins or resin solutions containing urethane groups, if desired using cataysts. Catalysts suitable for this purpose are catalysts known per se, for example tertiary amines such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-$\beta$-phenyl ethylamine, 1,2-dimethyl imidazole, and 2-methyl imidazole. Other suitable catalysts are Mannich bases known per se formed from secondary amines, such as dimethylamine, and aldehydes, preferably formaldehyde, or ketones such as acetone, methylethyl ketone, cyclohexanone and phenols, such as phenol, nonyl phenol, or bisphenol.

Tertiary amine catalysts containing isocyanate-reactive hydrogen atoms are, for example, triethanolamine, triisopropanolamine, N-methyl diethanolamine, N-ethyl diethanolamine, N,N-dimethyl ethanolamine and their reaction products with alkylene oxides such as propylene oxide and/or ethylene oxide.

Other suitable catalysts are silaamines with carbon-silicon bonds of the type described, for example, in DT-PS No. 1,229,290 (corresponding to U.S. Pat. No. 3,620,984), for example 2,2,4-trimethyl-2-silamorpholine and 1,3-diethylaminomethyl tetramethyl disiloxane.

Other suitable catalysts are nitrogen-containing bases, such as tetraalkyl ammonium hydroxides, also alkali metal hydroxides such as sodium hydroxide, alkali metal phenolates such as sodium phenolate or alkali metal alcoholates such as sodium methylate. Hexahydrotriazines may also be used as catalysts.

Organometallic compounds, especially organotin compounds, may also be used as catalysts.

Preferred organotin compounds are tin (II) salts of carboxylic acids, such as tin (II) acetate, tin (II) octoate, tin (II) ethyl hexoate and tin (II) laurate, and the tin (IV) compounds, for example dibutyl tin oxide, dibutyl tin dichloride, dibutyl tin diacetate, dibutyl tin dilaurate, dibutyl tin maleate or dioctyl tin diacetate. All the above-mentioned catalysts may, of course, also be used in the form of mixtures.

Further representatives of catalysts suitable for use in accordance with the invention and information on the way in which they work may be found in Kunststoff-Handbuch, Vieweg and Hochtlen, Vol. VIII, Carl-Hanser-Verlag, Munich 1966, for example on pages 96 to 102.

The catalysts are generally used in a quantity of from about 0.001 to 10% by weight, based on the quantity of isocyanate plus the reaction product of the polyepoxide and the (meth)acrylic acid.

Solvents suitable for the reaction of the hydroxyl groups with isocyanates are those solvents which were mentioned in connection with the reaction of the 1,2-epoxide groups with (meth)acrylic acid.

In the context of the invention, isocyanates are monoisocyanates, diisocyanates and polyisocyanates, preferably diisocyanates. In cases where polyisocyanates, i.e. isocyanates with a functionality of more than 2, are used either individually or in admixture with diisocyanates or monoisocyanates, the quantity of polyfunctional isocyanate should be limited in such a way that reaction products soluble in organic solvents are always obtained, which may readily be determined by a preliminary test.

The following are suitable aliphatic, cycloaliphatic, aromatic and heterocyclic compounds containing isocyanate groups, preferably aliphatic, cycloaliphatic and aromatic isocyanates:

phenyl isocyanate, methyl isocyanate, cyclohexyl isocyanate, stearyl isocyanate, hexamethylene diisocyanate, cyclohexane-1,4-diisocyanate, 2,4- and 2,6-tolylene diisocyanate and mixtures thereof, isophorone diisocyanate (1-isocyanatomethyl-5-isocyanato-1,3,3-trimethyl cyclohexane), phorone diisocyanate (2,2,4- and 2,4,4-trimethyl-hexamethylene-1,6-diisocyanate), 1,5-naphthalene diisocyanate, 1,3-cyclopentylene diisocyanate, m- and p-phenylene diisocyanate, 2,4,6-tolylene triisocyanate, 4,4',4''-triphenyl methane triisocyanate, 1,3- and 1,4-xylylene diisocyanate, 3,3'-dimethyl-4,4'-diphenyl methane diisocyanate, 4,4'-diphenyl methane diisocyanate, 3,3'-dimethyl biphenylene diisocyanate, 4,4'-bisphenylene diisocyanate, durene diisocyanate, 1-phenoxy-2,4'-phenylene diisocyanate, 1-tert.-butyl-2,4-phenylene diisocyanate, methylene-bis-4,4'-cyclohexyl diisocyanate, 1-chloro-2,4-phenylene diisocyanate and 4,4'-diphenyl ether diisocyanate.

It is also possible to use polyisocyanates of relatively high molecular weight and, optionally, also of relatively high functionality produced from low molecular weight parent compounds by a polymerisation reaction to form uretdiones or isocyanurate derivatives. Examples of compounds such as these are the uretdione formed from 2 moles of 2,4-tolylene diisocyanate and the polymerisation products containing isocyanurate rings fromed from 2,4- and 2,6-tolylene diisocyanate or hexamethylene diisocyanate, a system containing an average of 2 isocyanurate rings in the molecule and formed from 5 moles of tolylene diisocyanate or a corresponding derivative of, on average, 2 moles of tolylene diisocyanate and 3 moles of hexamethylene diisocyanate.

By another synthesis method, it is possible to produce higher urea- or biuret-bonded systems from diisocyanates or polyisocyanates by partial hydrolysis via the carbamic acid and amine stages, such as for example a biuret-bonded compound produced formally from 3 moles of hexamethylene diisocyanate in the presence of 1 mole of water, the reaction being accompanied by the elimination of 1 mole of carbon dioxide.

Other suitable compounds containing isocyanurate groups are obtained by the reaction of diols or polyols with difunctional or polyfunctional isocyanates. The molar ratio of hydroxy compound to the isocyanate is selected in such a way that free NCO-functions always remain present in the statistically formed reaction products and a molecular weight in the range of from 2000 to 3000 is not exceeded.

Particularly preferred isocyanate-containing compounds which may be used in the vinylically unsaturated resin synthesised in accordance with the invention are hexamethylene diisocyanate, tolylene diisocyanate, isophorone diisocyanate and 4,4'-diphenyl methane diisocyanate.

One hydroxy group is equivalent to one isocyanate group. The isocyanates are used in quantities such that from 30% to 90 mole % and preferably from 40% to 60 mole % of the hydroxy groups of the $\beta$-hydroxy(meth)acrylic acid esters are urethanised.

On completion of urethanisation, which is best carried out at temperatures in the range of from 40° to 80° C. and the end of which may be determined by analytical methods for detecting isocyanates, the final step is to add the cyclic dicarboxylic acid anhydride, preferably to the solution of the urethanised resin, in such a quantity that at least 10 mole % of the originally formed hydroxy groups of the β-hydroxy(meth)acrylic acid ester are esterified to form acid semiesters. In general, from 10 mole % to 70 mole % of the originally formed hydroxy groups of the β-hydroxy(meth-acrylic acid ester are esterified to form the acid semiester. In the preferred procedure, the reaction is actually carried out within this range. In addition, however, it is possible that, in the event of incomplete reaction of the polyepoxide with (meth)acrylic acid, 1,2-epoxide groups are still present after urethanisation or that the polyepoxides used as starting compounds already contain hydroxy groups. For example, it is possible by reacting bisphenol A-bis-glycidyl ether (2 moles) with 1 mole of adipic acid to obtain a polyepoxide starting product which, in addition to two epoxide groups, already contains two β-hydroxy ester groups. In cases such as these, it is possible to use more cyclic dicarboxylic acid anhydride than is necessary for converting from 10% to 70 mole % of the originally formed hydroxyl groups in the β-hydroxy(meth)acrylic acid ester. One hydroxyl group is equivalent to one cyclic dicarboxylic acid anhydride group. The upper limit to the total amount of dicarboxylic acid anhydride which may be used is imposed by the criterion that urethane resins soluble in organic solvents must always be formed.

The reaction of the urethanised resin to form the acid carboxylic acid semiester, the end product, is best carried out at temperatures in the range of from 40° C. to 80° C.

The following are examples of cyclic dicarboxylic acid anhydrides which are suitable for the reaction: maleic acid anhydride, itaconic acid anhydride, succinic acid anhydride, methyl succinic acid anhydride, ethyl succinic acid anhydride, glutaric acid anhydride, phthalic acid anhydride, tetrahydrophthalic acid anhydride, hexahydrophthalic acid anhydride, HET-acid anhydride, tetrachlorophthalic acid anhydride or mixtures thereof, and similar anhydrides which may react through ring opening to form the acid semiester. It is preferred to use succinic acid, phthalic acid and/or maleic acid anhydride, especially succinic acid anhydride.

On completion of this reaction, a clear resin or a resin solution is obtained, depending on whether the reaction has been carried out in the presence or absence of a solvent. Finally, one or more photoinitiators are added to the resin for its use as a starting material for a photoresist lacquer or for a photopolymer printing plate.

Suitable photoinitiators are the compounds normally used for this purpose, for example benzophenone and, quite generally, aromatic keto compounds derived from benzophenone, such as alkyl benzophenones, halogenmethylated benzophenones according to German Offenlegungsschrift No. 1,949,010, Michlers ketone, anthrone, or halogenated benzophenones. It is also possible to use benzoin and its derivatives, for example according to German Offenlegungsschrifts Nos. 1,769,168; 1,769,853; 1,769,854; 1,807,297; 1,807,301; 1,919,678 and German Auslegeschrift No. 1,694,149. Equally effective photoinitiators are anthraquinone and numerous of its derivatives, for example β-methyl anthraquinone, tert.-butyl anthraquinone and anthraquinone carboxylic acid esters, and also the oxime esters according to German Offenlegungsschrift No. 1,795,089.

Particularly preferred photoinitiators for use in the hardening of the reaction products according to the invention, optionally in the presence of other monomers, are benzoin derivatives corresponding to the general formula:

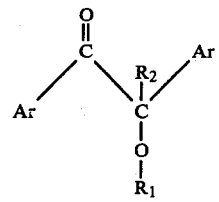

in which

Ar represents an unsubstituted aromatic radical or an aromatic radical substituted by alkyl, alkoxy or halogen;

$R_1$ = a straight-chain or branched alkyl radical with ($C_1$–$C_{12}$), cycloalkyl such as cyclohexyl, tetrahydropyranyl, or 1-methoxy ethyl;

$R_2$ = allyl benzyl, optionally substituted by halogen, or the radical —$CH_2$—$CH_2$—X, where X=CN, $CONH_2$ or $COOR_3$, and $R_3$ = II or lower alkyl ($C_1$–$C_{10}$).

Preferably, Ar represents phenyl, $R_1$ represents a straight-chain or branched alkyl radical with 1 to 4 carbon atoms and $R_2$ represents alkyl or the radical —$CH_2$—$CH_2$—X where X=CN or $COOR_3$, $R_3$ being $C_1$–$C_4$-alkyl.

The following are examples of suitable compounds of this type (cf. German offenlegungsschrift No. 1,769,854):

α-allyl benzoin methyl ether, α-allyl benzoin isopropyl ether, α-allyl benzoin ethyl ether, α-allyl benzoin butyl ether, α-allyl benzoin propyl ether, α-allyl benzoin octyl ether, α-allyl benzoin dodecyl ether, α-benzyl benzoin methyl ether, α-benzyl benzoin ethyl ether, α-benzyl benzoin propyl ether, α-benzyl benzoin isopropyl ether, α-benzyl benzoin butyl ether, α-(2-cyanoethyl)-benzoin methyl ether, α-(2-cyanoethyl)-benzoin ethyl ether, α-(2-cyanoethyl)-benzoin propyl ether, α-(2-cyanoethyl)-benzoin isopropyl ether, α-(2-cyanoethyl)-benzoin butyl ether, α-(2-cyanoethyl)-benzoin isobutyl ether, α-(2-cyanoethyl)-benzoin hexyl ether, α-(2-cyanoethyl)-benzoin octyl ether, α-(2-cyanoethyl)-benzoin dodecyl ether, α-(2-cyanoethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isopropyl ether, α-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyethyl)-benzoin methyl ether, α-(2-carbomethoxyethyl)-benzoin ethyl ether, α-(2-carbomethoxyethyl)-benzoin propyl ether, α-(carbomethoxyethyl)-benzoin isopropyl ether, α-(2-carbomethoxyethyl)-benzoin butyl ether, α-(2-carbomethoxyethyl)-benzoin isobutyl ether, α-(2-carbomethoxyethyl)-benzoin hexyl ether, α-(2-carbomethoxyethyl)-benzoin octyl ether, α-(2-carbomethoxyethyl)-benzoin dodecyl ether, α-(2-carbomethoxyethyl)-benzoin isooctyl ether, α-(2-carboethoxyethyl)-benzoin methyl ether, α-(2-carboethoxyethyl)-benzoin ethyl ether, α-(2-carboethoxyethyl)-benzoin propyl ether, α-(2-carboethoxyethyl)-benzoin isopropyl ether, α-(2-carboethoxyethyl)-benzoin butyl ether, α-(2-carboethoxyethyl)-benzoin isobutyl ether, α-(2-carboethoxyethyl)-benzoin hexyl ether, α-(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxyethyl)-benzoin methyl ether, α-(2-carbopropoxyethyl)-benzoin ethyl ether, α-(2-carbopropoxyethyl)-benzoin propyl ether, α-(2-carbopropoxyethyl)-benzoin isopropylether, α-(2-carbopropoxyethyl)-benzoin butyl ether, α-(2-carbopropoxyethyl)-benzoin isobutyl ether, α-(2-carbopropoxyethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl)-benzoin methyl ether, α-(2-carbo-n-butoxyethyl)-benzoin ethyl ether, α-(2-carbo-n-butoxyethyl)-benzoin propyl ether, α-(2-carbo-n-butoxyethyl)-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carbo-n-butoxyethyl)-benzoin octyl ether, α-(2-carbo-n-butoxyethyl)-benzoin dodecyl ether, α-(2-carbo-n-butoxyethyl)-benzoin isooctyl ether, α-(2-carboisooctoxyethyl)-benzoin methyl ether, α-(2-carboisooctoxyethyl)-benzoin ethyl ether, α-(2-carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisooctoxyethyl)-benzoin isooctyl ether, α-(2-carbonamidoethyl)-benzoin methyl ether, α-(2-cyanoethyl)-benzoin tetrahydropyranyl ether, α-(2-cyanoethyl)-benzoin-(1-methoxyethyl ether), α-(2-carbomethoxyethyl)-benzoin tetrahydropyranyl ether, α-(2-carbethoxyethyl)-benzoin-(1-methoxyethyl ether), α-(2-carbo-n-butoxyethyl)-benzoin tetrahydropyranyl ether and α-(2-carboisooctoxyethyl)-benzoin tetrahydropyranyl ether.

Another photoinitiator suitable for use in the resin system according to the invention is benzil dimethyl ketal and similar derivatives of benzil.

The photoinitiators are added to the resin in quantities of from 0.05% to 8% by weight and preferably in quantities of from 0.5 to 5% by weight, based on photopolymerisable solids.

In one preferred application, the resins according to the invention are used as resist materials. To this end, a resin solution is prepared by the process described above and, following evaporation of the solvent, dries off to form a solid tack-free film.

It may be necessary to add other solvents, for example to influence drying behaviour, plasticisers, levelling agents, dyes or other filling materials which have little or no absorption in the spectral region of the light initiating the photopolymerisation reaction. Similarly, it can be advisable from case to case to add other inert polymers and/or other monofunctional or polyfunctional vinyl compounds to the mixture.

The solution thus obtained is applied to the required layer substrate by dipping, spraying, casting, roll coating, centrifugal coating or by any other conventional coating technique. Following evaporation of the solvent, which may optionally be carried out at elevated temperature, for example at 80° C., a dry tack-free film is obtained.

This soluble coating may be crosslinked, for example by photopolymerisation, either directly or after transfer to another layer substrate.

The resin material according to the invention may be used with advantage and is particularly suitable for use as a dry resist film. To this end, a 5 to 100 μm thick film of the photopolymer is produced on a thin plastics layer, preferably a polyester film. Following evaporation of the solvent, the dry, as yet uncrosslinked layer may be protected by rolling on another film, for example of polyethylene or polypropylene, and subsequently stored in the absence of light until it is actually used.

The dry layer of the photopolymer according to the invention on the carrier film represents the actual dry resist film.

Using suitable laminating machines, this dry resist film may be laminated at elevated temperature onto the copper-coated carrier materials normally used in the electronics industry.

However, other suitable layer supports are metal foils of aluminium, zinc, magnesium, steel and the like, also paper, glass or films of polymeric products, such as cellulose esters, polyvinyl acetate, polystyrene, polycarbonates, especially based on bisphenylol alkanes, polyesters, especially based on polyethylene terephthalate, or polyamides such as nylon, for example. Other suitable layer supports are materials with a net-like structure such as metal gauzes.

Exposure of light of the layers produced in accordance with the invention is carried out with the light sources normally used for reproduction purposes, such as carbon arc lamps, xenon lamps, UV-fluorescent lamps, low pressure mercury lamps, or high pressure mercury lamps which, in addition to visible light, give a proportion of ultraviolet light which is particularly effective for polymerisation.

In the exposed areas, the photopolymer is crosslinked and insoluble. Development with organic solvents, for example chlorinated hydrocarbons, alcohols, ketones, esters and aromatic hydrocarbons, but preferably with alkaline aqueous solutions, gives a relief in the form of the imagewise exposure.

After exposure and development, the resist film according to the invention is distinguished by outstanding mechanical strength and outstanding adhesion to metallic supporting materials. This makes it particularly suitable for use in the etching solutions normally used, such as dilute nitric acid and iron (III) chloride solution, and also in the baths normally used for metal deposition. An important application of the layers according to the invention is as photoresists for the production of printed circuits, for the production of etched mouldings, for the production of mouldings by electroforming and also for the production of integrated microcircuits. The high mechanical strength and hardness of the photocrosslinkable layers according to the invention are particularly desirable for application as a printing plate in relief printing, intaglio printing or flat-bed printing, and also in the production of silk screens.

In particular, the extreme hardness of the polymerised resin facilitates the possibility of stereotypical working with the aid of a matrix. To this end, a layer which corresponds in thickness to the profile depth of a standard relief printing plate is produced with the resin material according to the invention on a suitable substrate. After exposure and development, for example in dilute soda solution, the relief obtained may be directly stereotyped with the materials normally used in practice. Direct use as a printing plate if, of course, also possible.

In this application, it is also possible to use certain fillers in the layers produced with the resin according to the invention. In particular, the development of a screen suitable for the printing process necessitates a certain scattering of the light used for polymerisation of the layer. This result may be achieved with suitable additives.

In the foregoing, the polymer systems crosslinkable by radical polymerisation have been discussed above all in regard to their use for certain photosensitive copying layers. It is obvious that the polymers according to the invention may also be used for other coatings where subsequent crosslinking is required. Thus, they may also be used quite generally for lacquers and coatings.

The crosslinking reaction does not have to be initiated exclusively by light. Other high energy radiation, such as electron beams, X-rays and, for example, $\gamma$-rays may also be used. The crosslinking reaction may also be initiated by the polymerisation initiators normally used for vinyl polymerisation, such as organic peroxides for example. Accordingly, the necessary limitation concerning the fillers used in photochemically initiated crosslinking does not apply to a broadened application such as this. In principle, it is possible to use any standard pigments and additives, for example those used in unsaturated polyester-styrene lacquers.

The production of the photopolymers according to the invention and their use are described in more detail in the following Examples:

EXAMPLE 1

1300 g of bisphenol A-bis-glycidyl ether (epoxide equivalent 190), 9 g of thiodiglycol (catalyst) and 0.36 g of p-methoxy phenol (inhibitor) were heated to 60° C. in a 3 liter three-necked flask equipped with a stirrer, dropping funnel and reflux condenser. 504 g of acrylic acid (7 moles) were then added dropwise over a period of 8 hours while air was passed through. After another 48 hours at 60° C., the resin contained no more epoxide groups. It was cooled to room temperature.

194 g of the resin thus obtained (containing 0.74 gram equivalents of OH) were dissolved in 200 g of methylene chloride, followed by the addition of 0.23 g of p-methoxy phenol and 1 ml of triethylamine. 33.6 g of hexamethylene diisocyanate (0.4 gram equivalents of NCO) were then added to this solution and the resulting mixture was heated under reflux for 48 hours while air was passed through. 38 g of phthalic acid anhydride (0.256 gram equivalents of anhydride) were than added, followed by further heating under reflux. After 2 hours, 8 g of benzil dimethyl ketal (photoinitiator) were added to the clear solution and, after the photoinitiator had dissolved, the solution was left to cool.

EXAMPLE 2

968 g of the reaction product of bisphenol A-bis-glycidyl ether and acrylic acid (containing 3.7 gram equivalents of OH) described in Example 1 were dissolved in 850 g of methylene chloride, followed by the addition of 0.6 ml of a concentrated zinc octoate solution and another 0.5 g of p-methoxy phenol. 168 g of hexamethylene diisocyanate (2 gram equivalents of NCO) were then added dropwise while the solution was boiled under reflux. After 24 hours' refluxing, an NCO-content of 0.5% was determined and 128 g of succinic acid anhydride (1.28 gram equivalents of anhydride) were added to the boiling solution. After another 12 hours, a clear solution was obtained to which 25.8 g of tert.-butyl anthraquinone (photoinitiator) were added, and the solution was left to cool.

EXAMPLE 3

1432 g of bisphenol A-bis-glycidyl ether [(epoxide equivalent 190) 7.53 gram equivalents of 1,2-epoxide groups], 10 g of thiodiglycol and 0.1 g of p-methoxy phenol were reacted at 100° C. with 292 g of adipic acid (4 gram equivalents of COOH) introduced in portions until the acid number 0 was reached. The product still contained 3.53 gram equivalents of 1,2-epoxide groups and 4 gram equivalents of OH. After the mixture had been cooled to 60° C., 144 g of acrylic acid (2 moles) were added dropwise. After 15 hours, the mixture was left to cool. The solid resin contained approximately 1.53 gram equivalents of 1,2-epoxide groups, 2 gram equivalents of OH ($\beta$-hydroxy acrylic acid ester group) and 4 gram equivalents of OH emanating from the reaction of diepoxide with adipic acid.

510 g of this solid resin, which contained 0.545 gram equivalents of OH ($\beta$-hydroxy acrylic ester group) and, in addition, 0.417 equivalents of 1,2-epoxide groups and 1.09 gram equivalents of OH, were dissolved in 480 g of trichlorethylene, 0.5 g of diazabicyclooctane and 1 g of hydroquinone were added and the mixture was heated to 60° C. 40 g of hexamethylene diisocyanate (0.48 gram equivalents of NCO) were added dropwise and the reaction mixture was kept at 60° C. for 24 hours. 74 g of phthalic acid anhydride (0.5 gram equivalent of anhydride) were then added, followed by stirring for another 8 hours at 60° C. Finally, 12.5 g of $\beta$-cyanoethyl benzoin ethyl ether were added as photoinitiator and the solution was cooled.

EXAMPLE 4

An unsaturated resin was produced in accordance with Example 2, the quantity of hexamethylene diisocyanate added being increased to 252 g (3 gram equivalents of NCO) and the quantity of succinic acid anhydride being reduced to 70 g (0.7 gram equivalents).

EXAMPLE 5

363 g of the reaction product of bisphenol A-bis-glycidyl ether and acrylic acid (containing 1.4 gram equivalents of OH) described in Example 1 were dissolved in 330 g of methylene chloride, 0.25 g of diazabicyclooctane and 0.1 g of p-methoxy phenol were added and the mixture was heated to reflux temperature. 83.3 g of isophorone diisocyanate (0.75 gram equivalents of NCO) were then added dropwise and the mixture was heated at 60° C. for 50 hours. Thereafter, the NCO-content amounted to 0.7% and 48 g of succinic acid anhydride (0.48 gram equivalents of anhydride) were added. After a clear solution had formed, it was diluted with another 100 ml of methylene chloride, followed by the addition of 8 g of benzophenone and 3 g of Michlers ketone. The solution was then cooled.

EXAMPLE 6

968 g of the reaction product of bisphenol A-bis-glycidyl ether and acrylic acid (containing 3.7 gram equivalents of OH) described in Example 1 were dissolved in 1990 g of anhydrous ethyl acetate, followed by the addition of 3 ml of a concentrated zinc octoate solution, 1 g of diazabicyclooctane and 0.27 g of p-methoxy phenol. 174 g of tolylene diisocyanate (2,4- and 2,6-isomer mixture) (2 gram equivalents of NCO) were added dropwise while the solution was kept at 60° to 65° C. After 24 hours at 60° C., the NCO-content amounted to 0.6%. 170 g of succinic acid anhydride (1.7 gram equivalents of anhydride) were added. After another 8 hours at 60° C., 26 g of β-cyanoethyl benzoin ethyl ether were added to the clear solution which was then cooled.

EXAMPLE 7

A resin was produced in the same way as in Example 6 except that the tolylene diisocyanate was replaced by 150 g of 4,4'-diisocyanatodiphenyl methane (1.2 gram equivalents of NCO).

EXAMPLE 8

1692 g of hexahydrophthalic acid bis-glycidyl ester (epoxide equivalent 148), 12.6 g of thiodiglycol and 0.5 g of p-methoxy phenol were heated to 60° C. in a 3 liter three-necked flask equipped with a stirrer, dropping funnel and reflux condenser. 820 g of acrylic acid were then added dropwise over a period of 8 hours while air was passed through. After another 48 hours at 60° C., all the epoxide groups had reacted. The resin was cooled to room temperature.

430 g of the resin thus produced (containing 1.99 gram equivalents of OH) were dissolved in 613 g of methylene chloride, followed by the addition of 0.1 g of p-methoxy phenol and 1.4 g of diazabicyclooctane. 87 g of tolylene diisocyanate (1 gram equivalent of NCO) were added to this solution and the mixture was stirred under reflux. After 24 hours, an NCO-content of 0.3% by weight was determined and 96 g of succinic acid anhydride (0.96 gram equivalents of anhydride) were added. After another 8 hours, 12 g of benzil dimethyl ketal were added as photoinitiator and the solution was cooled.

EXAMPLE 9

The bis-methacrylic acid ester was produced in accordance with Example 1 from bisphenol A-bis-glycidyl ether and methacrylic acid. This product was reacted with tolylene diisocyanate and succinic acid anhydride in accordance with Example 6. 2% by weight of 2-methyl anthraquinone was added to the resulting resin as photoinitiator.

EXAMPLES OF APPLICATION

EXAMPLE 10

The photosensitive polymer solution of Example 1 was diluted to 30% by weight with glycol acetate monomethyl ether and applied by centrifugal coating at 100 rpm to a clean copper plate. The layer was dried for 8 hours at room temperature. A tack-free layer with a thickness of 25μ was obtained.

The layer was exposed for 2 minutes through a 0.15 grey step wedge in a Chem-Cut vacuum frame (flat vacuum exposure frame). A sharp, positive relief image of 9 steps of the test wedge was obtained after development with 1% by weight sodium carbonate solution.

EXAMPLE 11

The photosensitive polymer solution of Example 1 was coated onto a 36μ thick polyester film from a dipping tray at a rate of 0.5 m/minute. After drying in warm air (80° C.), a 55μ thick layer was obtained on the film. This layer could be thermally transferred at 90° C. to a clean copper foil. After imagewise exposure (2 minutes, Chem Cut frame), the layer was developed in 1% by weight sodium carbonate solution. An extremely resistant, hard relief was obtained on the copper foil and even withstood etching with dilute $HNO_3$.

EXAMPLE 12

The photosensitive polymer solution of Example 6 was diluted to a solids content of 30% by weight by the addition of glycol acetate monomethyl ether, coloured with 0.5% by weight, based on solids, of a red dye [Rhodamin B; (C.I. Solvent Red 49)] and applied by centrifugal coating at 150 rpm to the copper layer of a copper-laminated plastics plate (phenol-formaldehyde resin). The layer was dried for 10 minutes at 60° C. and covered with a polyethylene film. After imagewise exposure for 4 minutes with a carbon arc lamp arranged at a distance of 50 cm, the film was run off and developed in the usual way with 1% by weight sodium carbonate solution. The relief was directly electroplated in an acid gold bath, showing excellent adhesion and no migration.

EXAMPLE 13

An exposed layer obtained in accordance with Example 12 on copper pertinax was developed in ethanol. The relief obtained was dried for 10 minutes at room temperature and could then be etched without difficulty in an $FeCl_3$-solution. This layer was also distinguished by extremely good adhesion.

EXAMPLE 14

The resin solution of Example 7 was coated in accordance with Example 11 onto a 36μ thick polyethylene terephthalate film, and dried in a stream of warm air. The layer obtained was covered with a polyethylene film and could be stored for 2 months at 60° C. in this form. Thereafter, the layer could still be thermally laminated without difficulty onto a copper plate. Exposure for 2 minutes in a Chem-Cut frame and development with 1% by weight sodium carbonate solution gave a strong relief with good adhesion.

EXAMPLE 15

The resin solution of Example 9 was also coated onto a polyester film and stored in accordance with Example 11. In this case, too, there was no reduction in the quality of the relief obtained after storage for 2 months at 60° C.

EXAMPLE 16

The resin solution of Example 6 was applied three times by centrifugal coating (with intermediate drying) to a brushed zinc plate. A dry layer with a thickness of 750μ was ultimately obtained. This layer was exposed imagewise for 3 minutes in a Chem-Cut frame. It was developed in 1% by weight sodium carbonate solution and the relief obtained was blown dry. This relief could be immediately reproduced without deformation. An exact copy of the original relief was obtained from the matrix.

EXAMPLE 17

The resin solution of Example 6 was applied by casting on a screen frame and allowed to running off in such a manner that an uniform film remained. The layer was dried for 10 minutes in warm air (80° C.) and after that coated again with an aqueous solution of polyvinyl alcohol. After drying for 10 minutes in warm air (80° C.) a presentitized screen having an excellent stability in storage was obtained.

After exposure for 4 minutes through a negative with 5 UV fluorescence lamps (type Philips, T1-AK) in 1% by weight sodium carbonate solution a sharp printing screen resulted. After drying for 10 minutes at 100° C. the silk screen could be used for printing.

I claim:

1. A product produced by the steps of reacting (a) a polyepoxide having more than one 1,2-epoxide group per molecule with at least one unsaturated acid selected from the group consisting of acrylic acid and methacrylic acid until 60 to 100 mol% of the 1,2-epoxide groups are converted into β-hydroxy acrylic or methacrylic acid ester groups, (b) reacting 30 to 90 mol% of the hydroxy groups of said β-hydroxy ester groups with an isocyanate to form urethane groups and (c) reacting 10 to 70 mol% of the hydroxy groups of said β-hydroxy ester groups with a cyclic dicarboxylic acid anhydride to form acid semiester groups.

2. The reaction product of claim 1 wherein said polyepoxide is a polyglycidyl ether of a polyhydric phenol.

3. The reaction product of claim 2 wherein said isocyanate is a diisocyanate.

4. The reaction product of claim 3 wherein said cyclic dicarboxylic acid anhydride is at least one member selected from the group consisting of the anhydrides of succinic acid, phthalic acid and maleic acid.

5. The reaction product of claim 1 wherein said polyepoxide is 4,4'-dihydroxy diphenyl dimethyl methane-bis-glycidyl ether, said at least one unsaturated acid is acrylic acid, said isocyanate is toluene diisocyanate and said cyclic dicarboxylic acid anhydride is succinic acid anhydride.

6. The reaction product of claim 1 wherein 90 to 100 mol% of the 1,2-epoxide groups are converted into β-hydroxy acrylic or methacrylic acid ester groups, 40 to 60 mol% of the hydroxy groups of said β-hydroxy ester groups are reacted with said isocyanate and 40 to 60 mol% of the hydroxy groups of said β-hydroxy ester groups are reacted with said cyclic dicarboxylic acid anhydride.

* * * * *